(12) United States Patent
Jo et al.

(10) Patent No.: US 8,405,798 B2
(45) Date of Patent: Mar. 26, 2013

(54) BACKLIGHT UNIT AND LIQUID CRYSTAL DISPLAY

(75) Inventors: Minso Jo, Seoul (KR); Hakmo Hwang, Goyang-si (KR)

(73) Assignee: LG Display Co., Ltd., Seoul (KR)

( * ) Notice: Subject to any disclaimer, the term of this patent is extended or adjusted under 35 U.S.C. 154(b) by 261 days.

(21) Appl. No.: 12/823,766

(22) Filed: Jun. 25, 2010

(65) Prior Publication Data
US 2011/0122338 A1   May 26, 2011

(30) Foreign Application Priority Data
Nov. 24, 2009   (KR) .................. 10-2009-0113951

(51) Int. Cl.
*G02F 1/1335*   (2006.01)
(52) U.S. Cl. ............... 349/69; 349/62; 349/63; 349/64; 349/65; 349/66; 349/67; 349/68
(58) Field of Classification Search ............... 349/62–69
See application file for complete search history.

(56) References Cited

U.S. PATENT DOCUMENTS
2008/0303973 A1   12/2008   Park et al.

FOREIGN PATENT DOCUMENTS
JP   8146396 A   6/1996
KR   20080061777 A   7/2008

OTHER PUBLICATIONS
Office Action issued in corresponding Korean Patent Application No. 10-2009-0113951, mailed Sep. 21, 2012.

*Primary Examiner* — Phu Vu
(74) *Attorney, Agent, or Firm* — Brinks Hofer Gilson & Lione

(57) ABSTRACT

Disclosed are a backlight unit capable of reducing heat and noise and a liquid crystal display using the same. The backlight unit comprises a light source unit comprising light sources for irradiating light; a cover bottom disposed under the light source unit; a vibration-absorbing member attached on the other surface of the cover bottom; and an inverter coupled to the cover bottom via the vibration absorbing member interposed therebetween.

12 Claims, 4 Drawing Sheets

FIG. 6B

| Measurement location | front side 0.5m | | | | rear side 0.5m | | | |
|---|---|---|---|---|---|---|---|---|
| Input voltage percentage | 20% | 40% | 60% | 80% | 20% | 40% | 60% | 80% |
| Measured value (dB) | 16.8 | 14.1 | 18.4 | 16.6 | 23.5 | 19.4 | 23.6 | 22.5 |
| | 16.9 | 14.2 | 18.1 | 16.7 | 23.4 | 19.4 | 23.6 | 22.5 |
| | 17.2 | 14.3 | 18.0 | 16.7 | 23.5 | 19.4 | 23.6 | 22.5 |
| | 16.8 | 14.3 | 18.2 | 17.2 | 23.4 | 19.6 | 23.6 | 22.9 |
| | 16.7 | 14.4 | 17.9 | 17.6 | 23.4 | 19.6 | 23.8 | 23.1 |
| Average (dB) | 16.9 | 14.3 | 18.1 | 17.0 | 23.4 | 19.5 | 23.6 | 22.7 |

FIG. 6C

| Measurement location | front side 0.5m | | | | rear side 0.5m | | | |
|---|---|---|---|---|---|---|---|---|
| Input voltage percentage | 20% | 40% | 60% | 80% | 20% | 40% | 60% | 80% |
| Measured value (dB) | 15.3 | 14.4 | 15.6 | 15.2 | 21.2 | 18.7 | 22.7 | 21.4 |
| | 15.3 | 14.3 | 15.7 | 15.6 | 21.2 | 18.7 | 23.0 | 21.7 |
| | 15.2 | 14.2 | 15.9 | 15.5 | 21.2 | 18.8 | 23.2 | 21.7 |
| | 15.4 | 14.3 | 16.0 | 15.6 | 21.3 | 18.8 | 23.3 | 21.7 |
| | 15.3 | 14.4 | 15.8 | 15.9 | 21.3 | 18.9 | 23.3 | 21.9 |
| Average (dB) | 15.3 | 14.3 | 15.8 | 15.6 | 21.2 | 18.8 | 23.1 | 21.7 |

BACKLIGHT UNIT AND LIQUID CRYSTAL DISPLAY

This application claims the priority and the benefit under 35 U.S.C. §119(a) on Patent Application No. 10-2009-113951 filed in Republic of Korea on Nov. 24, 2009 the entire contents of which are hereby incorporated by reference.

BACKGROUND

1. Field of the Invention

This document relates to a backlight unit capable of reducing heat and noise and a liquid crystal display (LCD) using the same.

2. Discussion of the Related Art

A liquid crystal display (LCD) has the characteristics of being light and thin and driven with low power consumption, so its applications are growing. The LCD is employed for a mobile computer such as a notebook computer, office automation equipment, audio/video devices, indoor/outdoor advertisement display device, and the like. A transmission type LCD, which is the most common LCD, displays an image by modulating light incident from a backlight unit by controlling an electric field applied to a liquid crystal layer.

The backlight unit is classified into a direct type backlight unit and an edge type backlight unit. The direct type backlight unit has such a structure that several light sources are arranged in a row on a lower surface of a light guide plate to allow light to directly proceed to a front surface of an LCD. The edge type backlight unit has such a structure that light sources are disposed to face the side of a light guide plate and a plurality of optical sheets are disposed between a liquid crystal panel and the light guide plate. In the edge type backlight unit, when the light sources irradiate light to one side of the light guide plate, the light guide plate converts linear light or point light outputted from the light sources into planar light and makes the planar light proceed to a front surface an LCD.

Conventionally, lamp-type light sources, such as CCFL (Cold Cathode Fluorescent Lamp), HCFL (Hot Cathode Fluorescent Lamp), EEFL (External Electrode Fluorescent Lamp), and the like, have been in use as light sources of the backlight unit. Recently, a light emitting diode (LED), which has advantages of being driven at a low voltage to reduce power consumption, having excellent color reproduction (or a color gamut) and contrast ratio, and having a long life span, is drawing attention, but it has problems with a heat generation and a light efficiency as low as one-third of that of lamp-type light sources. Thus, the lamp type light sources are still favored and commonly used.

A backlight unit employing lamp type light sources comprise an inverter applying driving power to drive the lamps. The inverter comprises a controller, a driver, a transformer, and a detector. The controller generates a driving frequency according to DC power supplied from a power supply source. The driver generates an AC current in response to the driving frequency generated from the controller. The transformer receives the AC current which has been generated by the driver, boosts (or raises) its voltage, and supplies the same to the lamps to turn on the lamps to illuminate light. The detector detects current from a resistor and transfers a signal including a state of the lamps to the controller as a feedback, so that the controller can control the inverter entirely.

The related art LCD having such an inverter will now be described. With reference to FIGS. 1 and 2, the related art LCD comprises a liquid crystal panel 50 for displaying an image, a top case 60 for protecting the liquid crystal panel, a plurality of lamps 10 disposed at predetermined intervals in a row and generating light, power terminal units 11 to which both ends of the lamps 10 are fastened, a reflective plate 12 for reflecting light, which goes toward a lower side of the lamps, toward an upper side of the lamps 10, a cover bottom 15 disposed under the reflective plate 12 to protect the lamps 10, the power terminal units 11 and the like, an inverter 20 disposed under the cover bottom 15, supplying driving power to the lamps 10, and comprising an inverter circuit unit 18 having a controller, a driver, and a detector, and a transformer 19, and an inverter cover shield 22 provided under the transformer 19 and protecting the inverter circuit unit 18 and the transformer 19. As shown in FIG. 2, the cover bottom 15 comprising a transformer cover shield comprises a data driving circuit cover shield 23 for protecting a data driving circuit (not shown) and a gate driving circuit cover shield 25 for protecting a gate driving circuit (not shown).

However, the inverter comprises a switching element such as a metal oxide semiconductor field effect transistor (MOSFET) in the driver in order to convert a DC voltage and a DC current into an AC voltage and an AC current and a transformer for boosting the AC voltage which has been converted into the AC current in the driver. According to the above-mentioned construction there are some problems that heat is generated by the MOSFET and vibration is generated by the transformer, thereby shortening a lift span of the device.

BRIEF SUMMARY

In an aspect, a backlight unit comprises: a light source unit comprising light sources for irradiating light; a cover bottom disposed under the light source unit; a vibration-absorbing member attached on the other surface of the cover bottom; and an inverter coupled to the cover bottom via the vibration absorbing member interposed therebetween.

In still another aspect, a liquid crystal display (LCD) comprises: a liquid crystal panel configured to display an image; and a backlight unit configured to irradiate light to the liquid crystal panel.

BRIEF DESCRIPTION OF THE DRAWINGS

The accompanying drawings, which are comprised to provide a further understanding of the invention and are incorporated in and constitute a part of this specification, illustrate embodiments of the invention and together with the description serve to explain the principles of the invention. In the drawings:

FIGS. 6A to 6C illustrate the results obtained by measuring noise generated in the related art LCD and the LCD according to an exemplary embodiment of the present invention, wherein FIG. 6A illustrates that the noise was measured at a location away by 0.5 m from the center of a front side of the LCD and at a location away by 0.5 m from the center of a rear side of the LCD, FIG. 6B is a table of noise measurement records of the related art LCD, and FIG. 6C is a table of noise measurement records of the LCD according to an exemplary embodiment of the present invention.

DETAILED DESCRIPTION OF THE DRAWINGS AND THE PRESENTLY PREFERRED EMBODIMENTS

Figure 1:
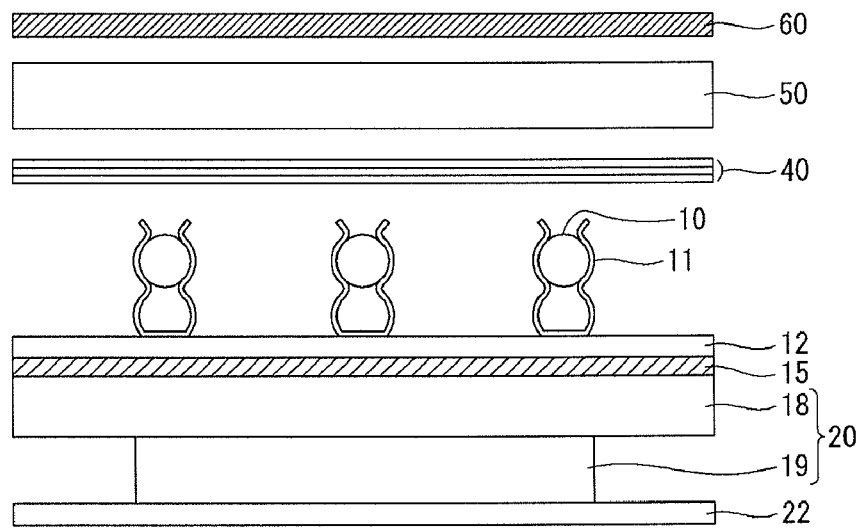
FIG. 1 is a side sectional view of the related art liquid crystal display employing a direct type backlight unit.
Figure 2:
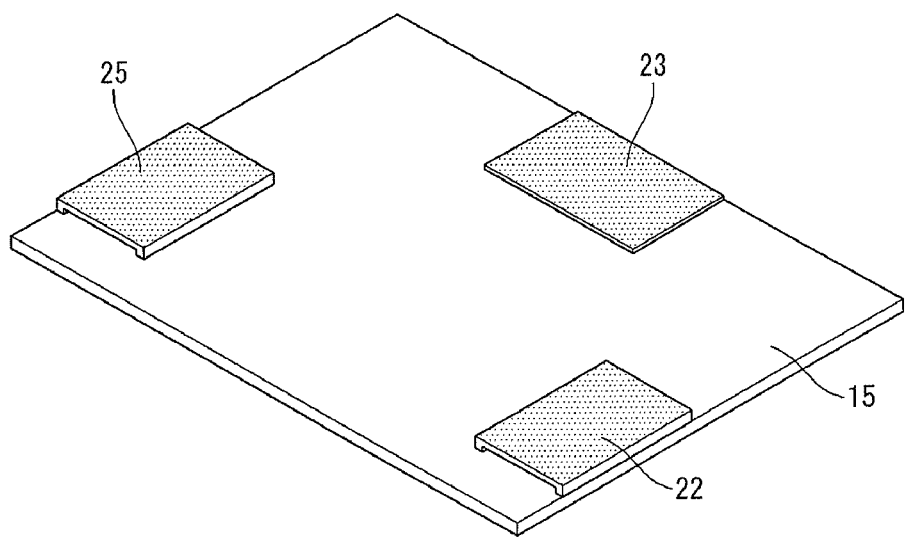
FIG. 2 is a schematic view showing the positions of cover shields formed on a rear surface of a cover bottom to protect a circuit driving unit and an inverter.

A backlight unit and a liquid crystal display (LCD) using the same according to exemplary embodiments of the present invention will now be described in detail with reference to the accompanying drawings. The like reference numerals denote the like elements throughout the specification.

Figure 3:
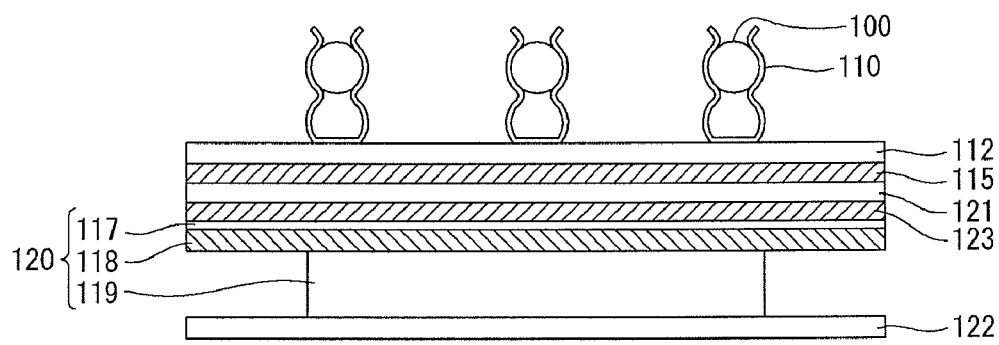
FIG. 3 is a side sectional view showing a portion of a direct type backlight unit according to a first exemplary embodiment of the present invention.

FIG. 3 is a side sectional view showing a portion of a direct type backlight unit according to a first exemplary embodiment of the present invention. With reference to FIG. 3, the direct type backlight unit according to the first exemplary embodiment of the present invention comprises a light source unit comprising a plurality of light sources disposed at predetermined intervals in a row and generating light and a power terminal unit 110 to which both ends of the light sources 100 are fastened, a reflective plate 112 disposed under the light source unit and reflecting light which goes toward a lower side of the light sources 100 to an upper side thereof, a cover bottom 115 coupled to the reflective plate 112 at a lower side of the light source unit, an inverter 120 attached to an outer side of the cover bottom 115 corresponding to the position where the light source unit is disposed and supplying driving power to the light sources 100, and an inverter cover shield 122 formed to accommodate the inverter 120 in order to protect the inverter 120.

In the present exemplary embodiment, linear light sources such as CCFL (Cold Cathode Fluorescent Lamp), HCFL (Hot Cathode Fluorescent Lamp), EEFL (External Electrode Fluorescent Lamp) and the like are used as the light sources 100 of the light source unit. However, without being limited thereto, point light sources such as LED (Light Emitting Diode), EL (Electro Luminescence) and the like may be also used as the light sources.

The reflective plate 112 is disposed under the light source unit and reflects light which goes toward the lower side of the light sources 100 to the upper side of the light source unit, thereby enhancing a usage efficiency of light.

The cover bottom 115 serves to protect the light source unit and the reflective plate 112 which are internal constituents of the backlight unit. The reflective plate 112 is attached to an inner surface of the cover bottom 115, and a data driving circuit cover shield for protecting a data driving circuit, a gate driving circuit cover shield for protecting a gate driving circuit, and an inverter cover shield 122 for protecting the inverter 120 are installed at an outer surface of the cover bottom 115.

The inverter 120 comprises an inverter circuit unit 118, a transformer 119, and an insulating layer 117. The inverter circuit unit 118 comprises a controller for generating a driving frequency according to DC power supplied from a power supply source, a driving unit for switching power to generate AC current in response to the driving frequency generated by the controller, and a detecting unit (not shown) for detecting current from a resistor, transferring a signal informing a state of a lamp to the controller so that the controller can control the inverter overall. The transformer 119 is disposed on one surface of the inverter circuit unit 118, boosts an AC voltage supplied from the driving unit and supplies the boosted AC voltage to the lamp 100 to turn on the lamp 100. The insulating layer 117 is attached on the other surface of the inverter circuit unit 118 facing the cover bottom side 115, to prevent the inverter circuit unit 118 from being electrically connected with the cover bottom 115 due to an electrical leakage or short. Accordingly, it is possible to prevent the device from being damaged.

The driving unit of the inverter is a switching element including a MOSFET. The MOSFET converts a DC voltage applied from an external source into an AC voltage of a corresponding frequency. In detail, when a DC voltage is inputted through a source terminal, the MOSFET converts the DC voltage into an AC voltage according to a pulse which has been received from a gate terminal connected with the inverter controller, and supplies the same to a drain terminal. The AC voltage, which has been converted by the MOSFET, is boosted by the transformer 119 and then supplied to the lamp 100 so that the lamp is turned on. Such operation makes the MOSFET generate a great deal of heat. Thus, it is necessary to release the heat generated from the MOSFET to lower temperature of the MOSFET so that operational characteristics of the inverter may be improved. In the present exemplary embodiment, a heat releasing member 121 is installed between the inverter 120 and the cover bottom 115 to allow heat generated from the MOSFET of the inverter 120 to be easily discharged to outside. Accordingly, the heat generated from the MOSFET can be easily discharged to outside. As a material of the heat releasing member 121, silver, copper, aluminum, and the like, having a high heat releasing effect, may be used, but the present invention is not meant to be limited thereto and any material can be used so long as it has a good heat releasing effect.

The backlight unit according to the present exemplary embodiment additionally includes a vibration-absorbing member 123 formed between the heat releasing member 121 and the insulating layer 117 of the inverter 120. The transformer 119 of the inverter 120 boosts the AC voltage supplied to the driving unit into a high level voltage through a winding ratio of a primary coil and a secondary coil wound on an iron core formed of multi-layered silicon steel. In the transformer 119, a magnetostrictive vibration is generated due to vibration by joint portions of the iron core silicon steels and an interlayer magnetic force, and in addition, a winding vibration is generated due to inter-coil vibration between coil conductors, thereby causing noise. The vibration-absorbing member 123 according to the present exemplary embodiment is formed between the heat releasing member 121 and the insulating layer 117 of the inverter to absorb the vibration caused by the transformer 119 to thus effectively reduce noise. The vibration-absorbing member 123 may be made of silicon, vibration-absorbing rubber, spring, and the like. Preferably, the vibration-absorbing member 123 is made of silicon, but the present invention is not meant to be limited thereto and any material can be used so long as it can suppress vibration. Also, the vibration-absorbing member 123 is disposed at a position corresponding to the transformer 119.

Figure 4:
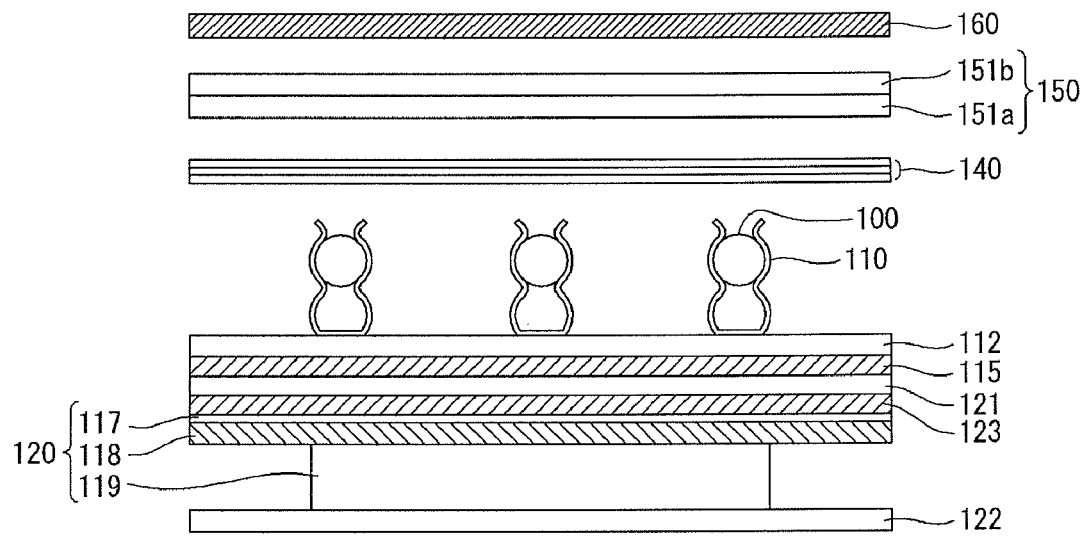
FIG. 4 is a side sectional view showing a partial configuration of a liquid crystal display (LCD) using the direct type backlight unit according to the first exemplary embodiment of the present invention.

FIG. 4 is a side sectional view showing a partial configuration of a liquid crystal display (LCD) using the direct type backlight unit according to the first exemplary embodiment of the present invention. With reference to FIG. 4, the LCD according to an exemplary embodiment of the present invention includes a backlight unit described above with reference to FIG. 3, optical sheets 140, a liquid crystal panel 150, and a case top 160.

The optical sheets 140 is disposed at an upper side of the light source unit, enhance uniformity of light emitted from the light sources 100 of the light source unit, and also enhance luminance by refracting and concentrating the light. Specifically, the optical sheets 140 include a diffusion sheet, a prism sheet, and a protection sheet. The diffusion sheet serves to diffuse light outputted from the light sources 100 to supply it to the liquid crystal panel 150. Two or three diffusion sheets may be used, or more diffusion sheets may be used in an overlapping manner. Triangular microprisms are formed on an upper surface of the prism sheet. Because the microprisms are formed at a predetermined angle, the prism sheet can concentrate light, which has been diffused by the diffusion sheet, in a direction perpendicular to the surface of the upper liquid crystal panel to provide uniform luminance distribution. The protection sheet protects the prism sheet vulnerable to scratches to allow the prism sheet to provide a uniform luminance distribution to the liquid crystal panel.

The liquid crystal panel 150 is disposed on the optical sheets 140, and includes a thin film transistor (TFT) substrate 151a with TFTs formed thereon and a color filter substrate 151b formed to face the TFT substrate 151a. The color filter substrate 151b includes black matrixes formed in a lattice form and color filters formed between the black matrixes. The TFT substrate 151a and the color filter substrate 151b are sealed by a sealant, and a liquid crystal layer is formed between the TFT substrate and the color filter substrate.

The case top 160, which is made of a metal material such as a galvanized steel plate, is coupled with the cover bottom 115 by a hook or a screw (not shown). The case top 160 accommodates the liquid crystal panel 150 and the backlight unit at the interior thereof together with the cover bottom 115, and defines an effective display area of the liquid crystal panel 150.

The direct type backlight unit using lamp type light sources such as CCFL, HCFL, EEFL, and the like, as light sources and the LCD using the same according to the first exemplary embodiment of the present invention have been described. However, the present invention is not limited thereto but is also applicable to an edge type backlight unit and an LCD using the same.

Figure 5:
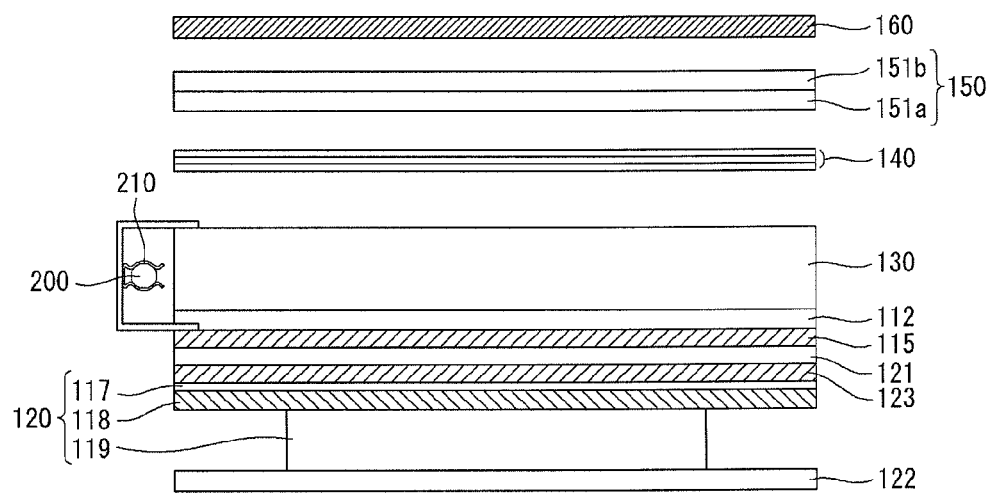
FIG. 5 is a side sectional view showing a partial configuration of a liquid crystal display (LCD) using an edge type backlight unit according to a second exemplary embodiment of the present invention.

FIG. 5 is a side sectional view showing a partial configuration of a liquid crystal display (LCD) using an edge type backlight unit according to a second exemplary embodiment of the present invention.

The LCD according to the second exemplary embodiment of the present invention illustrated in FIG. 5 has the same configuration as that of the LCD illustrated in FIG. 4, except that a light source 200 is disposed at one side of the backlight unit and a light guide plate 130 for guiding light emitted from the light source 200 toward the liquid crystal panel 150 is disposed between the reflective plate 112 and the optical sheets 140. Thus, the same reference numerals are used for the same elements and a description thereof will be omitted. Namely, the other elements than the light guide plate 130 in the second exemplary embodiment of the present invention are the same as those described in the first exemplary embodiment of the present invention, so only the light guide plate 130 will now be described.

The light guide plate 130 guides light incident to the light guide plate 130 from the light source 200 to an upward direction of the light guide plate 130, namely, toward the liquid crystal panel 150. To this end, a diffusion pattern (not shown) is formed on a lower surface of the light guide plate 130 in order to diffuse light, which normally goes to a lower side, to make it proceed to an upper side. Namely, the light guide plate 130 converts light incident from the light source 200 into uniform planar light and outputs the same to the plurality of optical sheets 140 disposed over the light guide plate 130. The light guide plate 130 may be made of a material having good refractive index and transmittance, namely, PMA (polymethylenemethacrylate), PC (polycarbonate), PE (polyethylene), cycloolefin-based resin (COP), and the like, but the present invention is not meant to be limited thereto.

Figure 6A:
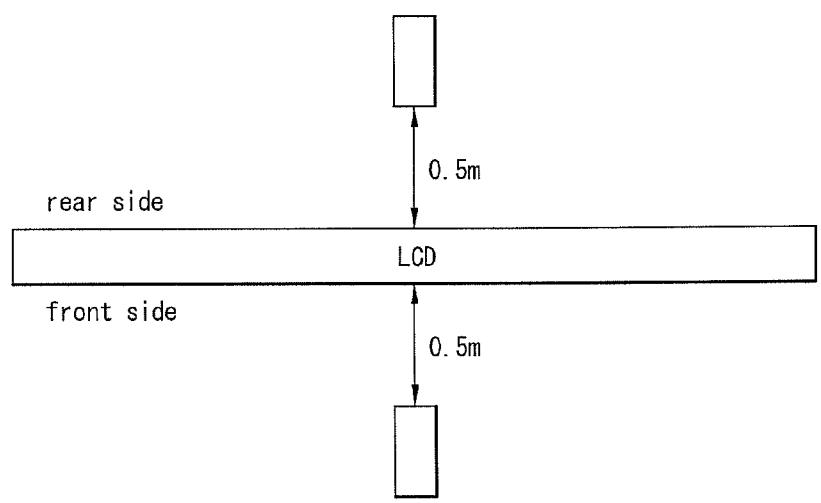

FIGS. 6A to 6C illustrate the results obtained by measuring noise generated in the related art LCD and in the LCD according to an exemplary embodiment of the present invention. Specifically, FIG. 6A illustrates that noise was measured at a location away by 0.5 m from the center of a front side of the LCD and at a location away by 0.5 m from the center of a rear side of the LCD, FIG. 6B is a table of noise measurement records of the related art LCD, and FIG. 6C is a table of noise measurement records of the LCD according to an exemplary embodiment of the present invention. As for the noise measurement conditions, noise was measured five times at a same voltage while changing voltages applied to the lamps and an average value was obtained under a full white display condition of a 32-inch full HD LCD.

First, noise was measured by increasing the percentage of the voltage applied to the lamp by 20 percent each time at the location away by 0.5 m from the center of the front side of the LCD under the full white condition. In the related art LCD, the results show that when the voltage percentage applied to the lamp was 20 percent, noise of 16.9 dB was obtained, when the voltage percentage was 40 percent, noise of 14.3 dB was obtained, when the voltage percentage was 60 percent, noise of 18.1 dB was obtained, and when the voltage percentage was 80 percent, noise of 17.0 dB was obtained. On the other hand, the results of the noise measurement for the LCD according to an exemplary embodiment of the present invention show that when the voltage percentage applied to the lamp was 20 percent, noise of 15.3 dB was obtained, when the voltage percentage applied to the lamp was 40 percent, noise of 14.3 dB was obtained, when the voltage percentage applied to the lamp was 60 percent, noise of 15.8 dB was obtained, and when the voltage percentage applied to the lamp was 80 percent, noise of 15.6 dB was obtained. It is noted from the experimentation results that the LCD according to the exemplary embodiment of the present invention attains a maximum 2.3 dB of noise reduction effect at the location away by 0.5 m from the center of the front side of the LCD according to the voltage applied to the lamp compared with the related art LCD.

In addition, noise was measured by increasing the percentage of the voltage applied to the lamp by 20 percent each time, at the location away by 0.5 m from the center of the rear side of the LCD under the same full white condition. In the related art LCD, the results show that when the voltage percentage applied to the lamp was 20 percent, noise of 23.4 dB was obtained, when the voltage percentage was 40 percent, noise of 19.5 dB was obtained, when the voltage percentage was 60 percent, noise of 23.6 dB was obtained, and when the voltage percentage was 80 percent, noise of 22.7 dB was obtained. On the other hand, the results of the noise measurement for the LCD according to an exemplary embodiment of the present invention show that when the voltage percentage applied to the lamp was 20 percent, noise of 21.2 dB was obtained, when the voltage percentage applied to the lamp was 40 percent, noise of 18.8 dB was obtained, when the voltage percentage applied to the lamp was 60 percent, noise of 23.1 dB was obtained, and when the voltage percentage applied to the lamp was 80 percent, noise of 21.7 dB was obtained. It is noted from the experimentation results that the LCD according to the exemplary embodiment of the present invention attains a maximum 2.2 dB of noise reduction effect at the location away by 0.5 m from the center of the rear side of the LCD according to the voltage applied to the lamp compared with the related art LCD.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. A backlight unit comprising:
   a light source unit comprising light sources that irradiates light;
   a cover bottom having one surface disposed under the light source unit;
   a vibration-absorbing member attached on the other surface of the cover bottom;
   an inverter coupled to the cover bottom via the vibration absorbing member interposed therebetween; and
   a heat releasing member formed between the vibration-absorbing member and the cover bottom to allow heat generated from the inverter to be easily discharged to outside.

2. The backlight unit of claim 1, wherein the light source unit is attached to the other side of the cover bottom.

3. The backlight unit of claim 1, further comprising a light guide plate configured to convert light incident from the light sources into a planar light.

4. The backlight unit of claim 1, wherein the inverter comprises:
   a controller configured to generate a driving frequency according to DC power supplied from a power supply source;
   an inverter circuit unit comprising a driving unit configured to generate an AC current in response to the driving frequency generated by the controller; and
   a transformer disposed on one surface of the inverter circuit unit to boost the AC voltage supplied from the driving unit, and supply the boosted AC voltage to the light source unit,
   wherein the vibration-absorbing member is attached on the other surface of the cover bottom at a position corresponding to the transformer.

5. The backlight unit of claim 4, wherein the inverter further comprises an insulating layer formed on the other surface of the inverter circuit unit to electrically insulate the inverter circuit unit and the cover bottom,
   wherein the insulating layer is formed between the vibration-absorbing member and the inverter circuit unit.

6. The backlight unit of claim 1, wherein the heat releasing member is made of a material selected from the group consisting of silver, copper, and aluminum.

7. A liquid crystal display comprising:
   a liquid crystal panel configured to display an image; and
   a backlight unit comprising a light source unit comprising light sources that irradiates light, a cover bottom having one surface disposed under the light source unit, a vibration-absorbing member attached on the other surface of the cover bottom, an inverter coupled to the cover bottom via the vibration absorbing member interposed therebetween; and
   a heat releasing member formed between the vibration-absorbing member and the cover bottom to allow heat generated from the inverter to be easily discharged to outside.

8. The liquid crystal display of claim 7, wherein the light source unit is attached to the other side of the cover bottom.

9. The liquid crystal display of claim 7, further comprising a light guide plate configured to convert light incident from the light sources into a planar light.

10. The liquid crystal display of claim 7, wherein the inverter comprises:
    a controller configured to generate a driving frequency according to DC power supplied from a power supply source;
    an inverter circuit unit comprising a driving unit configured to generate an AC current in response to the driving frequency generated by the controller; and
    a transformer disposed on one surface of the inverter circuit unit to boost the AC voltage supplied from the driving unit, and supply the boosted AC voltage to the light source unit,
    wherein the vibration-absorbing member is attached on the other surface of the cover bottom at a position corresponding to the transformer.

11. The liquid crystal display of claim 10, wherein the inverter further comprises an insulating layer formed on the other surface of the inverter circuit unit to electrically insulate the inverter circuit unit and the cover bottom,
    wherein the insulating layer is formed between the vibration-absorbing member and the inverter circuit unit.

12. The liquid crystal display of claim 7, wherein the heat releasing member is made of a material selected from the group consisting of silver, copper, and aluminum.

* * * * *